United States Patent [19]

Taylor

[11] 3,909,505

[45] Sept. 30, 1975

[54] MODULAR ELECTRICAL COMPONENT MOUNTING ASSEMBLY WITH INTEGRAL WIRING DUCT

[75] Inventor: Philip W. Taylor, Howell, Mich.

[73] Assignee: Taylor Industries Inc., Howell, Mich.

[22] Filed: Feb. 21, 1974

[21] Appl. No.: 444,397

[52] U.S. Cl. .............. 174/72 A; 174/68 C; 174/101; 317/122

[51] Int. Cl.² .............. H02B 1/20

[58] Field of Search ..... 24/255 R; 138/106; 317/99, 317/113, 122; 174/68 C, 72 A, 101

[56] References Cited

UNITED STATES PATENTS 3,403,900 10/1968 Turro .............. 174/72 A 3,763,401 10/1973 Ransom .............. 174/72 A

*Primary Examiner*—Gerald P. Tolin

*Attorney, Agent, or Firm*—Hauke, Patalidis & Dumont

[57] ABSTRACT

A modular assembly for mounting and interconnecting by means of electrical conductors a plurality of relays and other electrical components used in association with control panels or other wiring installations, with modules of the assembly forming integral wiring ducts when positioned in a side-by-side relationship on a plane surface.

14 Claims, 4 Drawing Figures

MODULAR ELECTRICAL COMPONENT MOUNTING ASSEMBLY WITH INTEGRAL WIRING DUCT

BACKGROUND OF THE INVENTION

In control panels for machine tools and the like and other wiring installations where relays and diverse electrical components are used, the sockets for these relays and other electrical components, or the components themselves, are generally mounted in rows on a surface, such as a panel, between rows of wiring ducts which are attached to the same surface. These components are then interconnected by means of a plurality of electrical conductors which are disposed in and run as bundles through the wiring ducts. One of the major problems associated with mounting components in this manner is that the terminals to which the electrical conductors are attached are close to the mounting surface and the high side walls of the wiring duct restrict free access to the terminals, making the task of attaching the wires very difficult. Although more shallow wiring ducts could be used to eliminate this problem, their use would increase the overall size of the panel as wider ducts would then be required to contain the same number of electrical conductors.

SUMMARY OF THE INVENTION

It is one of the objects of this invention to reduce the space required in electrical control panels for mounting and interconnecting by means of electrial conductors various electrical components and sockets into which plug-in relays and other electrical components are inserted. This invention also reduces the time and effort required to install and interconnect electrical components and sockets for electrical components situated in control panels.

The present invention relates to a novel wiring duct assembly which is formed between adjacent component mounting modules and a cover module, and between a component mounting module, an adjacent side closure module, and a cover module for containing bundles of electrial conductors used with electrical components and sockets for plug-in electrical components disposed on the mounting modules. These integral wiring ducts reduce the need for additional separate wiring ducts to contain bundles of electrical conductors used to interconnect other components mounted elsewhere as these bundles of electrical conductors may also be enclosed in the integral wiring ducts.

The novel integral wiring ducts of the invention use a portion or all of the area underneath the raised mounting platform of the component mounting modules for additional electrical conductor space. This arrangement allows the distance between the rows of electrical components to be relatively small and still maintain a relatively large cross area wireway for the bundles of electrical conductors.

The present invention further comprises provisions for a pattern of mounting holes or slots in the raised mounting platform which are capable of accommodating sockets for electrical components of different designs.

BRIEF DESCRIPTION OF THE DRAWINGS

Reference is now made to the drawings in which like or equivalent parts appearing in more than one FIGURE are referred to by the same reference characters, and in which.

DESCRIPTION OF THE PREFERRED EMBODIMENTS

Figure 1:
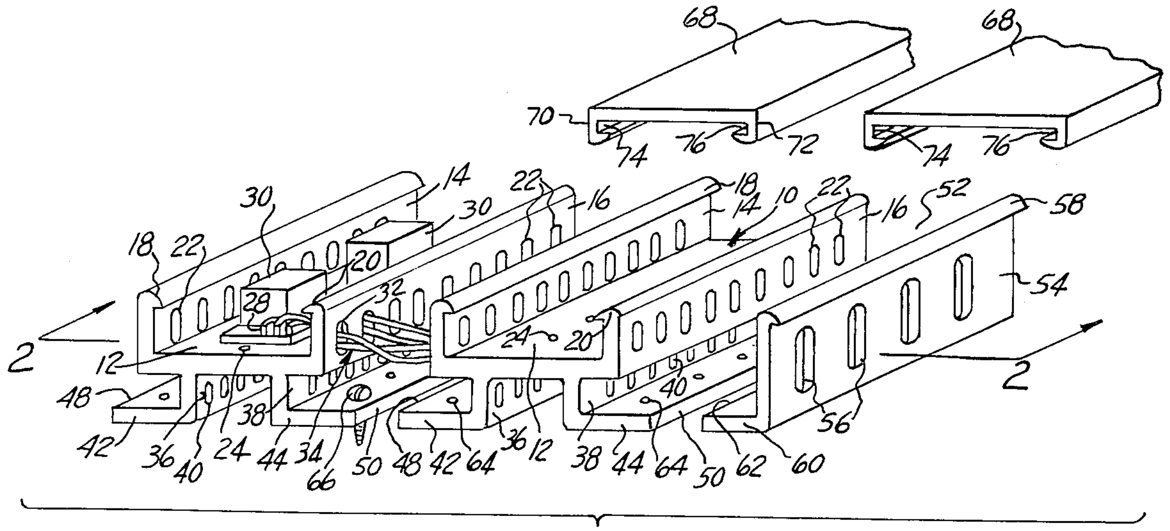
FIG. 1 is an exploded perspective view of the modular mounting assembly with integral wiring ducts which best illustrates the relationship between the individual modules.

Referring now to the several Figures, component mounting module 10 has a raised component mounting platform 12 with two integrally formed, longitudinally disposed, upwardly extending, substantially parallel and spaced apart sidewalls 14 and 16. The upper edges of these sidewalls each have inwardly projecting lips 18 and 20. The raised component mounting platform 12 is provided with a plurality of mounting holes 24 for mounting relay sockets 26 into which plug-in relays 30 are installed. These same mounting holes 24 can be used for mounting other small electrical components on the raised mounting platform 12. Sidewalls 14 and 16 are provided with a plurality of openings 22 through which individual electrical conductors 32 may pass from a bundle of electrical conductors 34 to terminals 28 on relay mounting socket 26 interconnecting each of the relays 30 with various other electrical components. Two longitudinally disposed, substantially parallel, and spaced apart leg members 36 and 38 support the raised mounting platform 12. A plurality of apertures 40 are provided in the leg members 36 and 38 to allow additional electrical conductors to run beneath the raised component mounting platform 12. The lower ends of the leg members 36 and 38 have outwardly projecting flanges 42 and 44 which are disposed to lie flat upon a plane mounting surface 46. The flanges 42 and 44 are provided with outermost longitudinal edges 48 and 50, respectively.

Figure 2:
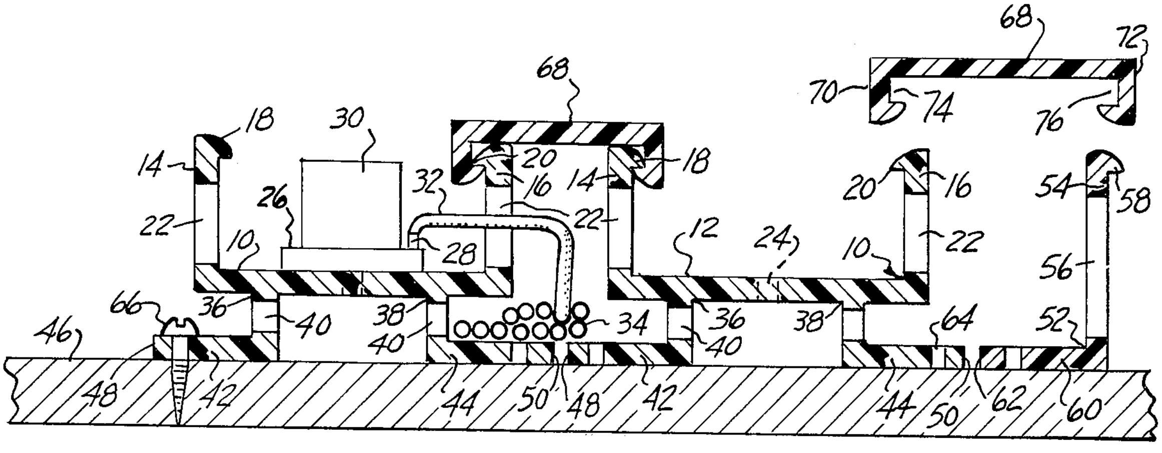
FIG. 2 is a cross-sectional view of the modular mounting assembly with integral wiring ducts as viewed along the line 2—2 of FIG. 1.

A side closure module 52 having an "L" shaped cross-sectional configuration is shown on the right-hand side of FIGS. 1 and 2. This side closure module has a single longitudinally disposed, substantially vertical, wall 54 with a plurality of apertures 56 therein for passing electrical conductors therethrough. An outwardly projecting lip 58 is longitudinally disposed along the upper edge of the vertical wall 54. The lower edge of the vertical wall 54 is integral with a horizontal support flange 60 which is disposed to lie flat against the plane mounting surface 46. The horizontal support flange 60 has an outermost longitudinal edge 62. A plurality of openings 64 are provided in flanges 42, 44 and 60 for fasteners 66 used to secure the component mounting module 10 and the side closure module 52 to the plane mounting surface 46 in a side-by-side fashion.

FIGS. 1 and 2 also show a wiring duct cover module 68 with two longitudinally disposed, downwardly extending, flanges 70 and 72, each of which is provided with an inner recess 74 and 76 designed to snap over lips 18, 20, or 58.

FIG. 2 is a compressed cross-sectional view of the exploded assembly shown in FIG. 1 as viewed through line 2—2 with the cover module for the wiring duct formed by mounting two component mounting modules in a side-by-side relationship being shown in place, and the cover module fo r the wiring duct formed between a component mounting module and a side closure module being shown positioned above the duct. An integral wiring duct is formed when two component mounting modules 10 are disposed on a plane mounting surface 46 such that the outermost longitudinal edge 50 on the flange 44 of one of the modules is juxtaposed alongside the outermost longitudinal edge 48 on the flange 42 of another component mounting module. An integral wiring duct is also formed between a component mounting module 10 and the "L" shaped side closure module 52 when both are disposed on a plane mounting surface 46 such that the outermost longitudinal edge 62 of the horizontal support flange 60 is juxtaposed alongside either the outermost longitudinal edge 48 of the flange 42 or the outermost longitudinal edge 50 of the flange 44.

Figure 3:
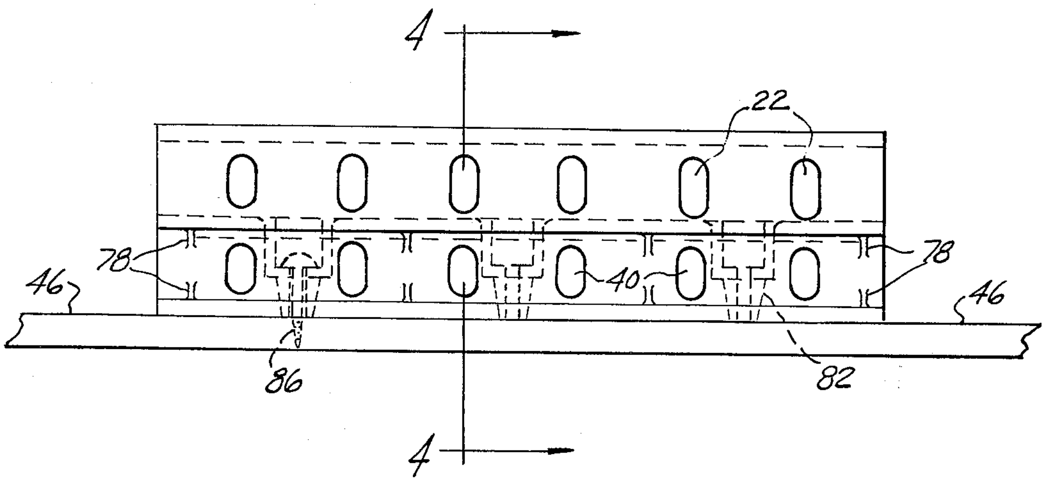
FIG. 3 is a side view of a modified component mounting module showing stiffening ribs, an alternative component mounting means, and additional countersunk holes on centerline for attaching the module to a plane mounting surface.
Figure 4:
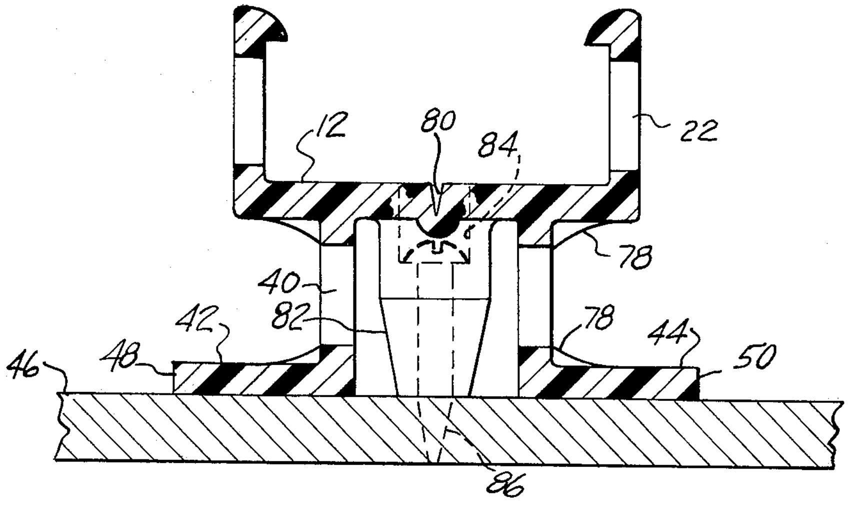
FIG. 4 is a cross-sectional view of the component mounting module as viewed along line 4—4 of FIG. 3.

It may be advantageous, as shown in FIGS. 3 and 4, to provide stiffening ribs 78 to improve the structural rigidity of the component mounting module. These stiffening ribs are used to allow the component mounting modules to be manufactured with a minimum amount of material consistent with the structural rigidity requirements of the parts. Although not shown, stiffening ribs may also be used on the side closure module 52 between the single vertical wall 54 and the horizontal support flange 60.

FIGS. 3 and 4 show an alternative component mounting means which further comprises a slot 80 in the raised mounting platform 12 on the centerline of the component mounting module 10 through which fasteners can be passed to mount relay sockets or other electrical components. Although not shown, other means such as cored holes, with or without bosses, or additional slots through or blind, may be used to mount various components on the raised mounting platform 12. In FIGS. 3 and 4, the raised mounting platform 12 is provided with a downwardly extending boss 82 having an end engageable against the plane mounting surface 46. The boss 82 is provided with a countersunk bore 84 through which a fastener 86 is disposed for securing the component mounting module 10 to the plane mounting surface 46.

The modules of the invention are preferably manufactured from an insulating plastic by injection molding. Although other means, such as extrusion, could be used to manufacture the modules, the advantage of molding the modules is that the parts are manufactured automatically and ejected in a completed form free of secondary operations.

Having thus described the invention, what is claimed as new is:

1. An electrical component mounting module for forming an integral wiring duct when two such modules are installed in a side-by-side relationship on a plane mounting surface, comprising a raised component rectangular mounting platform made of dielectric material a pair of longitudinally disposed, upwardly extending, substantially parallel and spaced apart sidewalls integrally formed with said platform along two opposite edges thereof, a pair of longitudinally disposed, substantially parallel and spaced apart leg members, the upper ends of such leg members being integral with and extending downward from said raised component mounting platform and an outwardly projecting flange integrally formed at the lower end of each of said leg members and extending substantially parallel to said platform, each of said flanges having an outermost longitudinal edge projecting further outward than said sidewalls and apertures in said sidewalls for passage therethrough of electrical conductors.

2. An electrical component mounting module as claimed in claim 1 wherein said leg members are provided with apertures for passing electrical conductors.

3. An electrical component mounting module as claimed in claim 1 wherein said outwardly projecting flanges are provided with openings through which fasteners are passed for securing a module to said plane mounting surface.

4. An electrical component mounting module as claimed in claim 1 wherein said raised mounting platform is provided with a downwardly extending boss having an end engageable with a plane mounting surface, said boss having a central aperture for accepting a fastener for securing said module to said plane mounting surface.

5. A modular electrical component mounting and wiring duct assembly comprising:

a first component mounting module comprising a raised component rectangular mounting platform made of dielectric material, a pair of longitudinally disposed, upwardly extending, substantially parallel and spaced apart sidewalls integrally formed with said platform along two opposite edges thereof, a pair of longitudinally disposed, substantially parallel and spaced apart leg members, the upper ends of said leg members being integral with and extending downward from said raised component mounting platform and an outwardly projecting flange integrally formed at the lower end of each of said leg members and extending substantially parallel to said platform, each of said flanges having an outermost longitudinal edge projecting further outward than said sidewalls and apertures in said sidewalls for passage therethrough of electrical conductors; and a second substantially alike component mounting module juxtaposed alongside said first component mounting module, said first and second modules being supported on a planar surface, whereby said first and second modules form a wiring duct therebetween, said wiring duct being defined by a pair of adjacent said sidewalls, a pair of adjacent said leg members and a pair of adjacent said outwardly projecting flanges.

6. A modular electrical component mounting assembly as set forth in claim 5 further comprising a cover module for said wiring duct, said cover module including means for removably attaching said cover module to the upper ends of said adjacent sidewalls for closing said wiring duct.

7. A modular electrical component mounting assembly as set forth in claim 5 wherein said leg members are provided with apertures for passing electrical conductors.

8. A modular electrical component mounting assembly as set forth in claim 5 wherein said outwardly projecting flanges are provided with openings through which fasteners are passed for securing each of said modules to a plane mounting surface.

9. A modular electrical component mounting assembly as set forth in claim 5 wherein said raised mounting platform is provided with a downwardly extending boss having an end engageable with said plane mounting surface, a boss having a central aperture for accepting a fastener for securing each of said modules to said plane mounting surface.

10. A modular electrical component mounting and wiring duct assembly comprising:

a component mounting module comprising a raised component rectangular mounting platform made of dielectric material, a pair of longitudinally disposed, upwardly extending, substantially parallel and spaced apart sidewalls integrally formed with said platform along two opposite edges thereof, a pair of longitudinally disposed, substantially parallel and spaced apart leg members, the upper ends of said leg members being integral with and extending downward from said raised component mounting platform and an outwardly projecting flange integrally formed at the lower end of each of said leg members and extending substantially parallel to said platform, each of said flanges having an outermost longitudinal edge projecting further outward than said sidewalls and apertures in said sidewalls for passage therethrough of electrical conductors; and an L-shaped side closure module made of dielectric material and comprising a single longitudinally disposed substantially vertical wall and a horizontal support flange integral with said vertical wall for mounting on a plane mounting surface, longitudinally parallel with and adjacent to said component mounting module, said mounting module and said L-shaped module being mounted on a planar surface, whereby said first component mounting module and said L-shaped side closure module form a wiring duct therebetween, said wiring duct being defined by said vertical wall and one of said side walls, one of said leg members, said horizontal support flange, and one of said outwardly projecting flanges of said component mounting module.

11. A modular electrical component mounting assembly as set forth in claim 10 further comprising a cover module for said wiring duct, said cover module including means for removably attaching said cover module to the upper end of said verticall wall of said L-shaped side closure module and to the upper end of said sidewall of said component mounting module for closing said wiring duct.

12. A modular electrical component mounting assembly as set forth in claim 10 wherein said leg members are provided with apertures for passing electrical conductors.

13. A modular electrical component mounting assembly as set forth in claim 10 wherein said outwardly projecting flanges are provided with openings through which fasteners are passed for securing each of said modules to said plane mounting surface.

14. A modular electrical component mounting assembly as set forth in claim 12 wherein said raised mounting platform is provided with a downwardly extending boss having an end engageable with said plane mounting surface, said boss having a central aperture for accepting a fastener for securing each of said modules to said plane mounting surface.

* * * * *